(12) United States Patent
Odaohhara et al.

(10) Patent No.: US 9,287,728 B2
(45) Date of Patent: Mar. 15, 2016

(54) BATTERY PACK

(75) Inventors: Shigefumi Odaohhara, Kanagawa-ken (JP); Hiromitsu Yamaguchi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 402 days.

(21) Appl. No.: 12/871,338

(22) Filed: Aug. 30, 2010

(65) Prior Publication Data

US 2011/0050175 A1 Mar. 3, 2011

(30) Foreign Application Priority Data

Aug. 31, 2009 (JP) .................................. 2009-200654

(51) Int. Cl.

| H02J 7/16 | (2006.01) |
|---|---|
| H02J 7/00 | (2006.01) |
| H01M 10/44 | (2006.01) |
| H01M 10/48 | (2006.01) |
| G06F 1/16 | (2006.01) |
| G06F 1/26 | (2006.01) |

(52) U.S. Cl.
CPC ............. *H02J 7/0031* (2013.01); *G06F 1/1635* (2013.01); *G06F 1/263* (2013.01); *H01M 10/443* (2013.01); *H01M 10/486* (2013.01)

(58) Field of Classification Search
CPC ...................................................... H02J 7/0091
USPC .................................. 320/152, 134, 160, 106
See application file for complete search history.

(56) References Cited

U.S. PATENT DOCUMENTS

| 5,248,927 | A | * | 9/1993 | Takei ................... H01M 2/1055 320/113 |
|---|---|---|---|---|
| 5,371,456 | A | * | 12/1994 | Brainard ........................ 320/161 |
| 5,422,560 | A | * | 6/1995 | Yan ................. 320/160 |
| 5,633,573 | A | * | 5/1997 | van Phuoc et al. ............ 320/128 |
| 5,648,715 | A | * | 7/1997 | Patino et al. ................... 320/152 |
| 5,703,471 | A | * | 12/1997 | Bullock ................ H01M 10/46 320/134 |
| 5,767,659 | A | * | 6/1998 | Farley ........................... 320/106 |
| 5,890,780 | A | * | 4/1999 | Tomiyori .............. H02J 7/0031 307/86 |
| 5,955,797 | A | * | 9/1999 | Kim ....................... G06F 1/1616 307/150 |
| 6,152,597 | A | * | 11/2000 | Potega .......................... 374/185 |
| 7,728,547 | B2 | * | 6/2010 | Lim et al. ...................... 320/106 |
| 8,259,221 | B1 | * | 9/2012 | Kaplan et al. ................. 348/372 |
| 2008/0180059 | A1 | * | 7/2008 | Carrier ...................... B25F 5/00 320/112 |

(Continued)

FOREIGN PATENT DOCUMENTS

| CN | 101123358 A1 | 2/2008 |
|---|---|---|
| CN | 101494280 A1 | 7/2009 |

(Continued)

*Primary Examiner* — Drew A Dunn
*Assistant Examiner* — Steve T Chung
(74) *Attorney, Agent, or Firm* — Ference & Associates LLC (57) ABSTRACT

A battery pack that can avoid an abnormal condition caused by heat generation associated with water adhesion to a connector part and a function stopping method of the battery pack are provided. A battery controller determines an abnormality and executes an operation of interrupting a charge/discharge path for a battery set formed by a charge/discharge circuit, when a detected temperature of a connector is equal to or more than a first threshold, and also a discharge current is equal to or more than a second threshold and/or a difference between the detected temperature of the connector and a detected temperature of another part (a discharge protection switch, a charge protection switch, and the battery set) is equal to or more than a third threshold.

19 Claims, 6 Drawing Sheets

(56) References Cited

U.S. PATENT DOCUMENTS

| | | | | |
|---|---|---|---|---|
| 2009/0195210 A1* | 8/2009 | Takeuchi | ............ | H01M 10/625 320/134 |
| 2010/0188054 A1* | 7/2010 | Asakura | ............... | G01R 31/025 320/161 |
| 2011/0025272 A1* | 2/2011 | Nagashima | ............ | H02J 7/0022 320/119 |

FOREIGN PATENT DOCUMENTS

| | | |
|---|---|---|
| JP | A09-153352 A1 | 6/1997 |
| JP | 2003-132862 | 5/2003 |
| JP | 2008-027826 A1 | 2/2008 |
| JP | 2009-176486 A1 | 8/2009 |
| JP | 2009-191743 A1 | 8/2009 |

* cited by examiner

Fig. 6

BATTERY PACK

CLAIM FOR PRIORITY

This application claims priority from Japanese Patent Application No. 2009-200654, filed on Aug. 31, 2009, and which is fully incorporated by reference as if set forth herein.

FIELD OF THE INVENTION

The subject matter described herein relates to a battery pack and a function stopping method of the battery pack, and particularly relates to a battery pack that is connected to an electronic device via a connector and carries a secondary battery.

BACKGROUND

A battery having a large charge/discharge capacity density such as a lithium ion battery is not frequently used alone. The battery is used in a state of being installed in a battery-operated device, as a battery pack housed in a synthetic resin-made housing together with internal components that include a charge/discharge protection circuit for protecting the battery by interrupting conduction when an excessive current flows as in the case of short-circuiting of a battery terminal or when the battery is overcharged or overdischarged.

Such a battery pack is used as a power source for various electronic devices such as computers, mobile phones, PDA's, electric tools, and transportation equipment, and so it is inevitable that water is spilled over the battery pack or the battery pack is dropped into water in everyday life. Since water adhering to a connector of the battery pack in this case has a sufficient electric conductivity for allowing a current to flow through water, there is a problem that an abnormal condition (for example, melt of a connector part or its vicinity) is caused by heat generation due to short-circuiting between positive and negative electrodes of the connector or an electric circuit failure may occur.

For example, Japanese Patent Application Laid-Open No. 2003-132862 describes a battery pack having a battery and a battery protection circuit substrate. The battery pack includes: a leak detection circuit that outputs a leak detection signal when a current leak detection electrode (water sensor) conducts; a charge semiconductor switch control circuit that interrupts a charge semiconductor switch according to any of the leak detection signal and an overdischarge detection signal output upon overcharge detection of a battery protection circuit; and a discharge semiconductor switch control circuit that interrupts a discharge semiconductor switch according to any of the leak detection signal and an overdischarge detection current output upon overdischarge detection of the battery protection circuit. The leak detection electrode is connected to an electrode of one polarity of the battery, and the leak current detection circuit, the charge semiconductor switch control circuit, and the overdischarge semiconductor switch control circuit are connected to an electrode of an opposite polarity of the battery.

Though describing a structure of detecting water in a battery pack by a current leak detection electrode (water sensor), Japanese Patent Application Laid-Open No. 2003-132862 does not give any consideration to an abnormal condition that is caused by heat generation due to water adhesion to a connector part.

BRIEF SUMMARY

One aspect provides an apparatus comprising: one or more elements requiring power; a housing that houses the one or more elements; a battery pack for supplying power, the battery pack having a connector that connects the battery pack to the one or more elements, the battery pack further comprising: a charge/discharge circuit that forms a charge/discharge path; a first temperature element disposed near the connector; a second temperature element disposed near another part of the battery pack; and a discharge measurement element for measuring a discharge current; and a controller configured to disable the battery pack responsive to determining a spill abnormality characterized by heat generation due to water adhesion to the connector.

Another aspect provides a method comprising: determining a spill abnormality characterized by heat generation due to water adhesion to a connector of a battery pack; and disabling the battery pack responsive to determining the spill abnormality.

A further aspect provides a battery pack comprising: a connector that connects the battery pack to the one or more elements requiring power; a charge/discharge circuit that forms a charge/discharge path; a first temperature element disposed near the connector; a second temperature element disposed near another part of the battery pack; a discharge measurement element for measuring a discharge current; and a controller configured to disable the battery pack responsive to determining a spill abnormality characterized by heat generation due to water adhesion to the connector The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

FIG. 1(*a-b*) illustrates an overall structure of a laptop PC.

FIG. 2(*a-b*) is a schematic perspective view of a battery pack.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of example embodiments.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation. It will be readily understood that the methods, systems, computer program products, and apparatuses described in detail herein simply represent example implementations and use contexts, and that the embodiments are equally applicable to other implementations and use contexts.

Embodiments provide for a battery pack that can avoid an abnormal condition caused by heat generation associated with water adhesion to a connector part, and a function stopping method of the battery pack.

Embodiments provide a battery pack that is connected to an electronic device via a connector and carries a secondary battery, the battery pack including: a charge/discharge circuit that forms a charge/discharge path for the secondary battery; a first temperature detection means disposed near the connector, for detecting a temperature of the connector; a second temperature detection means for detecting a temperature of another part in the battery pack; a discharge measurement means for measuring a discharge current of the secondary battery; and a control means for determining an abnormality and executing an operation of interrupting the charge/discharge path, when the temperature detected by the first temperature detection means is equal to or more than a first threshold, and also the discharge current measured by the discharge measurement means is equal to or more than a second threshold and/or a difference between the temperature detected by the first temperature detection means and the temperature detected by the second temperature detection means is equal to or more than a third threshold.

Embodiments describe that the other part in the battery pack is a secondary battery or a switching element.

Embodiments describe the operation of interrupting the charge/discharge path is at least one of an operation of interrupting the charge/discharge path by a switching element that forms a part of the charge/discharge path and an operation of blowing a fuse that forms a part of the charge/discharge path.

Embodiments describe that the connector and the switching element are disposed on the same substrate.

Embodiments describe a function stopping method of a battery pack that is connected to an electronic device via a connector and carries a secondary battery, the function stopping method including: a step of detecting a temperature of the connector; a step of detecting a temperature of another part in the battery pack; a step of measuring a discharge current of the secondary battery; and a step of determining an abnormality and executing an operation of interrupting a charge/discharge path for battery cells formed by a charge/discharge circuit, when the detected temperature of the connector is equal to or more than a first threshold, and also the measured discharge current is equal to or more than a second threshold and/or a difference between the detected temperature of the connector and the detected temperature of the other part is equal to or more than a third threshold.

Embodiments describe a battery pack that is connected to an electronic device via a connector and carries a secondary battery, including: a charge/discharge circuit that forms a charge/discharge path for the secondary battery; a first temperature detection means disposed near the connector, for detecting a temperature of the connector; a second temperature detection means for detecting a temperature of another part in the battery pack; a discharge measurement means for measuring a discharge current of the secondary battery; and a control means for determining an abnormality and executing an operation of interrupting the charge/discharge path, when the temperature detected by the first temperature detection means is equal to or more than a first threshold, and also the discharge current measured by the discharge measurement means is equal to or more than a second threshold and/or a difference between the temperature detected by the first temperature detection means and the temperature detected by the second temperature detection means is equal to or more than a third threshold. Hence, it is possible to provide a battery pack that can avoid an abnormal condition caused by heat generation associated with water adhesion to a connector part, and a function stopping method of the battery pack.

The following describes an embodiment of a battery pack in detail, with reference to drawings. Note that the embodiments are not limited to this embodiment. Moreover, components in the embodiment described below include components easily assumed by a person skilled in the art or substantially the same components.

Figure 1A:
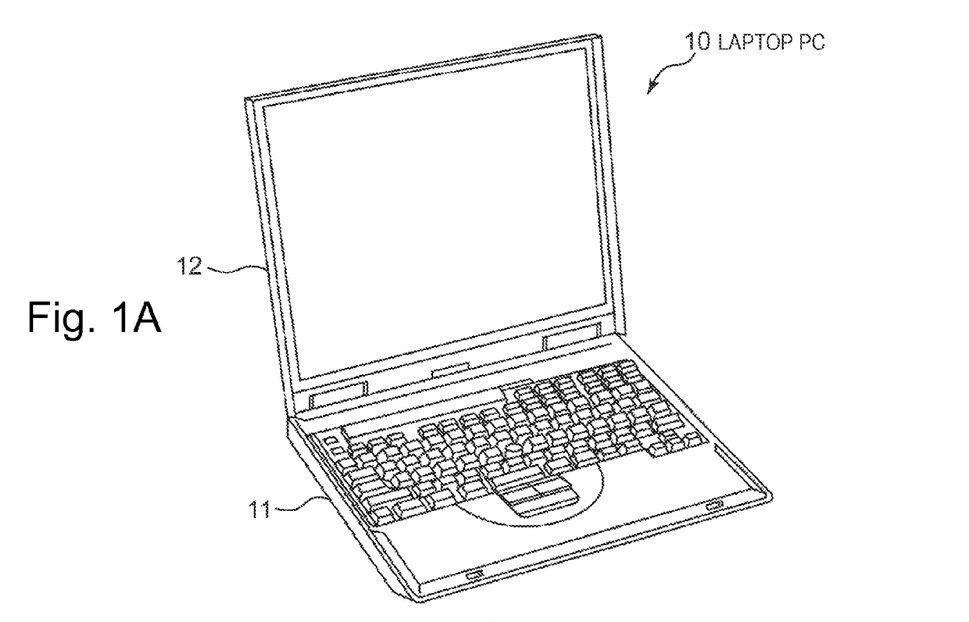
Figure 1B:
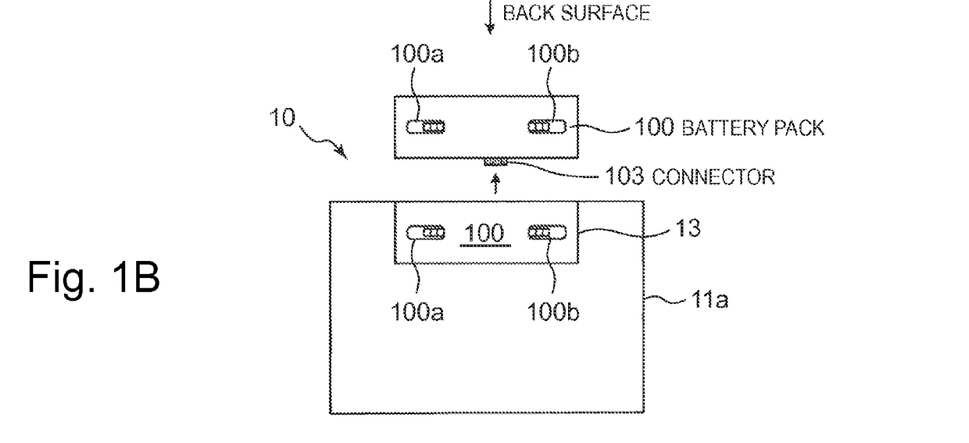

Referring now to FIG. 1(a-b), therein is depicted an overall structure of a laptop PC according to an embodiment. FIG. 1(a) is a perspective view in a state where the laptop PC is opened to be used by a user, and FIG. 1(b) is a plan view showing a bottom surface of a main unit-side housing in a state with a battery pack installed in the laptop PC.

As shown in FIG. 1, a laptop PC 10 includes a main unit-side housing 11 that has a keyboard and a pointing device on its surface and houses a large number of devices inside, and a display-side housing 12 that has a liquid crystal display (LCD) on its surface. The display-side housing 12 is attached to the main unit-side housing 11 so as to be freely opened/closed. A battery bay 13 is provided in a rear part of a bottom surface 11a of the main unit-side housing 11, and a battery pack 100 is installed in the battery bay 13. When the battery pack 100 is not installed in the battery bay 13, the battery bay 13 is empty. When the battery pack 100 is installed in the battery bay 13, the bottom surface 11a of the main unit-side housing 11 and a part of a housing of the battery pack 100 are on the substantially same plane.

The battery pack 100 has one pair of hooks 100a and 100b for fixing to the battery bay 13. When the battery pack 100 is stored in the battery bay 13, the battery pack 100 is fixed to the main unit-side housing 11 by locking the hooks 100a and 100b, and detached from the main unit-side housing 11 by unlocking the hooks 100a and 100b. The battery pack 100 has a connector (female connector) 103 on its surface.

In one non-limiting example, when water is spilled over the laptop PC 10 and that water adheres to the connector 103, the water adhering to the connector 103 has a sufficient electric conductivity to allow a current to flow through the water, so that the connector 103 may abnormally increase in temperature due to short-circuiting between the positive and negative electrodes of the connector 103. In one embodiment, a temperature element is provided near the connector 103 in order to detect a temperature increase of the connector 103 caused by a SPILL (water leak) as described later.

Figure 2A:
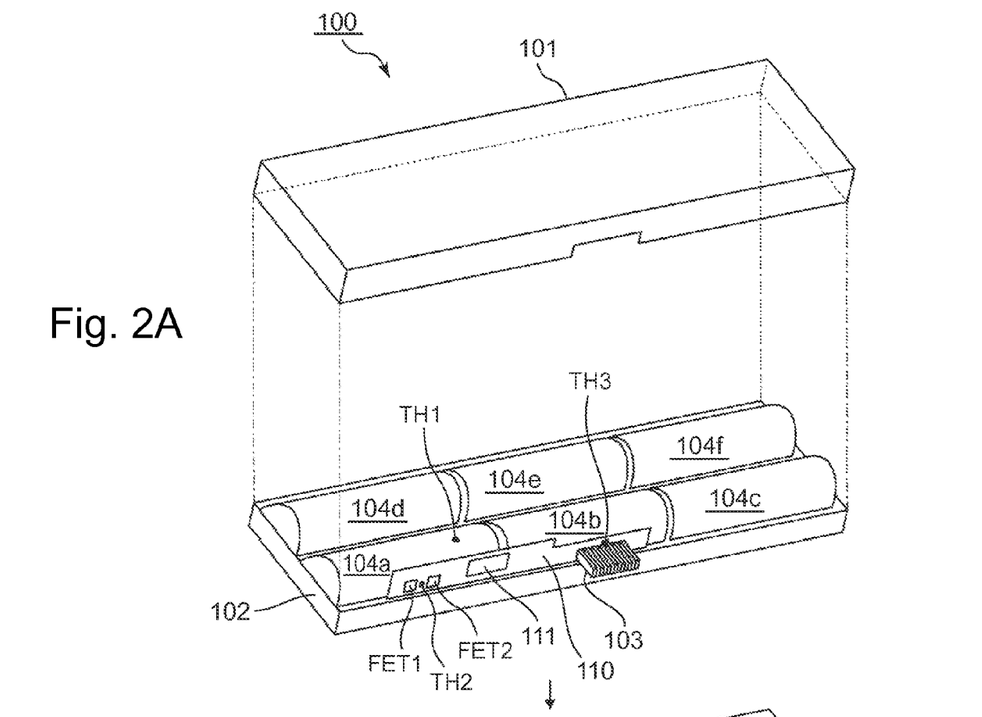
Figure 2B:
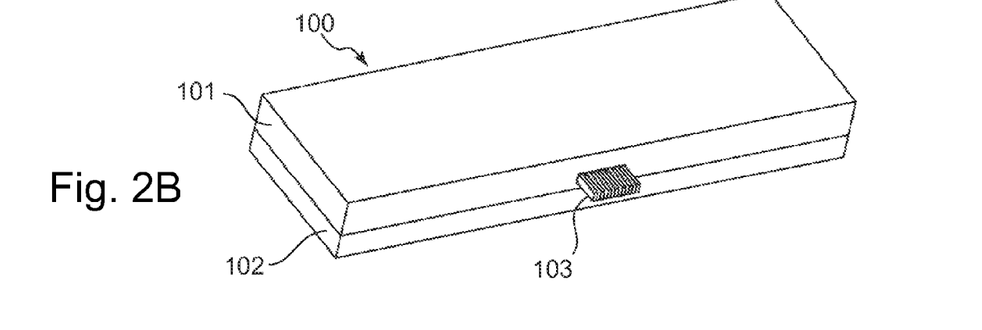

FIG. 2(a-b) is a schematic perspective view of the battery pack 100 in FIG. 1. FIG. 2(a) is a schematic exploded perspective view of the battery pack 100 before assembly, and FIG. 2(b) is a schematic perspective view of the battery pack 100 after assembly. In one non-limiting example, as shown in FIG. 2, in the battery pack 100, a lower housing 102 houses six cylindrical battery cells 104a to 104f which are lithium ion battery cells and a circuit substrate 110, in a pre-assembly state.

The circuit substrate 110 carries a battery controller 111, a discharge protection switch FET1, a charge protection switch FET2, the connector 103, a temperature element TH3 (first temperature detection means) disposed near the connector 103, a temperature element TH2 (second temperature detection means) disposed near the discharge protection switch FET1 and the charge protection switch FET2, and other circuit components such as a resistor and a capacitor (not shown). In addition, a temperature sensor TH1 (second temperature detection means) is attached to a surface of the battery cell 104a. In one embodiment, a thermal conductive resin (glue) may cover between the temperature element TH3 and the connector 103 and between the temperature element TH2 and each of the discharge protection switch FET1 and the charge protection switch FET2. This enables temperatures of the connector 103, the discharge protection switch FET1, and the charge protection switch FET2 to be detected with high accuracy.

The battery cells 104a and 104d, the battery cells 104b and 104e, and the battery cells 104c and 104f are connected in parallel in pairs, thereby forming battery cell columns. Furthermore, the battery cells connected in parallel in pairs are connected in series, and an output voltage of the series-connected battery cells is input to a control circuit. The connector (female connector) formed on the surface of the battery pack 100 has a power terminal and a control terminal (not shown). When the battery pack 100 is installed in the battery bay 13, each of these terminals is connected to a corresponding terminal formed in the battery bay 13.

An upper housing 101 and the lower housing 102 are molded, in one non-limiting example, by die casting of an aluminum alloy or a magnesium alloy. When the battery pack 100 is installed in the battery bay 13, a bottom surface of the lower housing 102 is positioned on substantially the same plane as the bottom surface 11a of the main unit-side housing 11, and forms a part of an outline of the main unit of the laptop PC 10. The lower housing 102 and the upper housing 101 having such structures are bonded by an adhesive to thereby form the battery pack 100 which is one package of a substantially rectangular parallelepiped.

Figure 3:
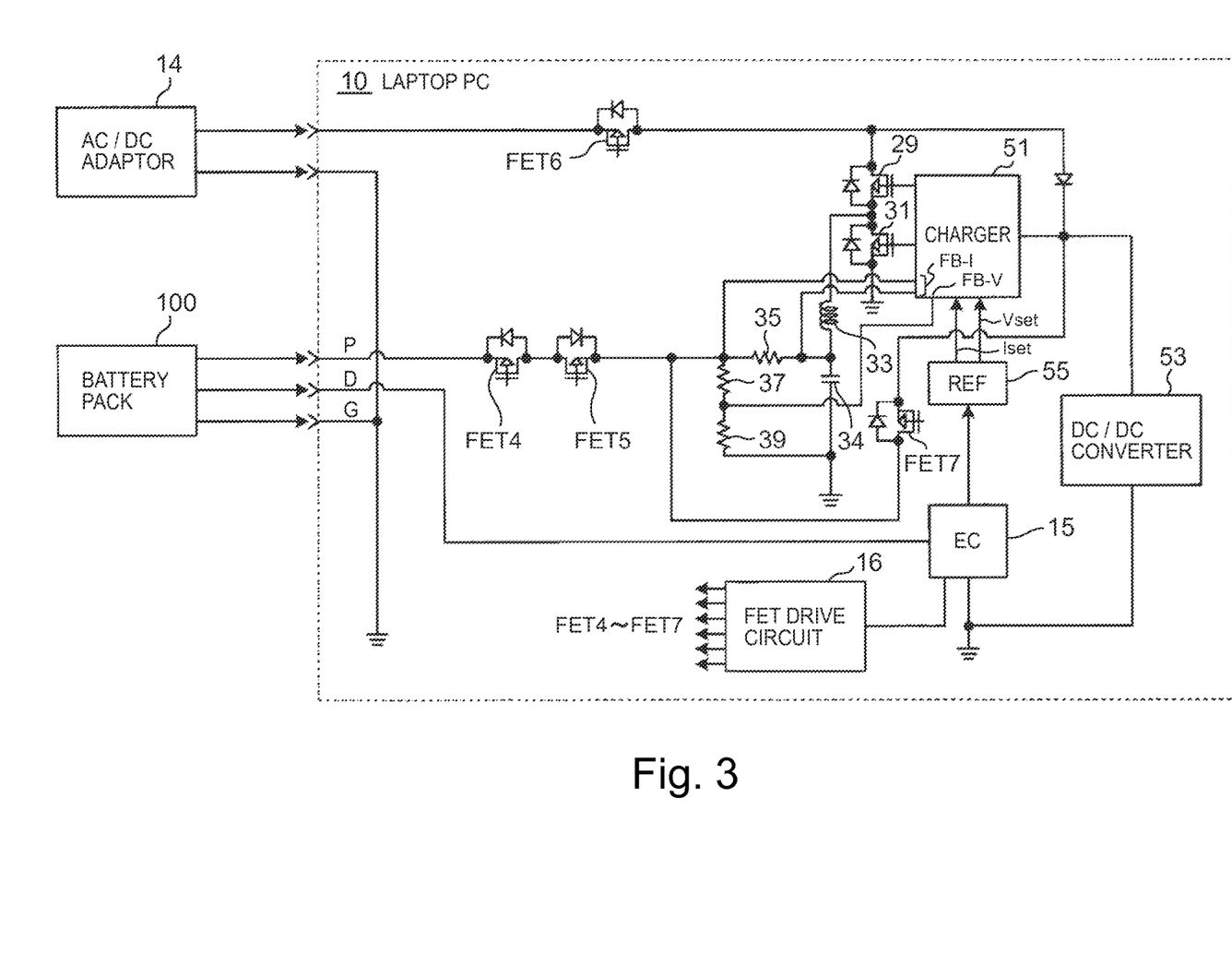
FIG. 3 is a block diagram showing a schematic structure of a battery system of a laptop PC.

FIG. 3 is a block diagram showing a schematic structure of a battery system of the laptop PC 10 described above. The battery system according to this embodiment is composed of the laptop PC 10, an AC/DC adaptor 14, and the battery pack 100. Regarding the laptop PC 10, only a structure of a main part relating to one embodiment is shown in the drawing.

The AC/DC adaptor 14 is connectable to a power terminal of the laptop PC 10, and converts an AC voltage to a DC voltage.

The laptop PC 10 includes an embedded controller (hereafter referred to as "EC") 15, a FET drive circuit 16, a charger 51, a DC/DC converter 53, and a reference voltage source (hereafter referred to as "REF") 55. The charger 51 has a constant current constant voltage property, and includes a switching control circuit that controls ON/OFF of FETs 29 and 31 according to a Pulse Width Modulation ("PWM") method.

The charger 51 converts a DC voltage input from the AC/DC adaptor 14 to a DC voltage suitable for charging the battery pack 100, and outputs the converted DC voltage. The charger 51 reduces, by a smoothing circuit composed of an inductor 33 and a capacitor 34, pulses of a DC charge current generated by driving the switching control circuit, thereby generating a constant current.

Outputs from voltage dividing resistors 37 and 39 and a current sensing resistor 35 are connected to a voltage feedback input FB-V and a current feedback input FB-I of the charger 51, and voltages corresponding to an output voltage (charge voltage) and an output current (charge current) output from the charger 51 are input for feedback control.

A voltage from the REF 55 obtained by dividing a constant voltage generated in the laptop PC 10 is input to a current set value input Iset and a voltage set value input Vset of the charger 51. The REF 55 inputs a set voltage Vchg to the voltage set value input Vset and a set current Ichg to the current set value input Iset, based on an instruction from the EC 15. The charger 51 operates so that the output voltage or the output current matches the set voltage Vchg or the set current Ichg.

In an early stage of charge, the charger 51 operates by constant current control. However, when the charge progresses and the charge current decreases to below the set current Ichg, the charger 51 operates by constant voltage control so that the output voltage automatically matches the set voltage Vchg. Conversely, when the charge voltage decreases to below the set voltage Vchg due to some cause during an operation by constant voltage control, the charger 51 operates by constant current control so that the output current automatically matches the set current Ichg.

The EC 15 is an integrated circuit that controls not only the power source but also many hardware elements of the laptop PC 10. Through communication with the battery pack 100, the EC 15 can obtain information generated by the battery pack 100, including, but not limited to, a battery cell surface temperature, a battery voltage, a charge current, charge power, discharge power, a remaining capacity, and the set voltage Vchg and the set current Ichg to be set in the charger 51. The EC 15 instructs the REF 55 to operate or stop the charger 51, based on an instruction received from the battery pack 100. In one non-limiting example, when the battery pack 100 instructs the EC 15 to set the set voltage Vchg and the set current Ichg to zero, zero is set to the voltage set value input Vset and the current set value input Iset, and accordingly the charger 51 stops its operation. To start the operation of the charger 51, the EC 15 instructed from the battery pack 100 sets the set voltage Vchg and the set current Ichg to the voltage set value input Vset and the current set value input Iset.

The DC/DC converter 53 converts a DC voltage received from the AC/DC adaptor 14 or the battery pack 100 to a predetermined voltage, and supplies the predetermined voltage to devices in the laptop PC 10. These devices include, but are not limited to, a CPU, a liquid crystal display, a wireless module, a hard disk device, and a controller. FET4 and FET5 are switches for controlling charge/discharge of the battery pack 100, and are connected to a charge/discharge circuit of the battery pack 100.

FET7 is connected between the battery pack 100 and the DC/DC converter 53, and is a switch for forming a discharge circuit from the battery pack 100 to the DC/DC converter 53. FETE is connected to a circuit that supplies power from the AC/DC adaptor 14 to the DC/DC converter 53, and is a switch for temporarily supplying power from the battery pack 100 to the DC/DC converter 53 in order to perform the so-called peak shift of suspending reception of power from an AC power source to alleviate a peak of the AC power source when power is supplied from the AC/DC adaptor 14 to the DC/DC converter 53. The FET drive circuit 16 controls FET4 to FET7 based on an instruction from the EC 15.

Figure 4:
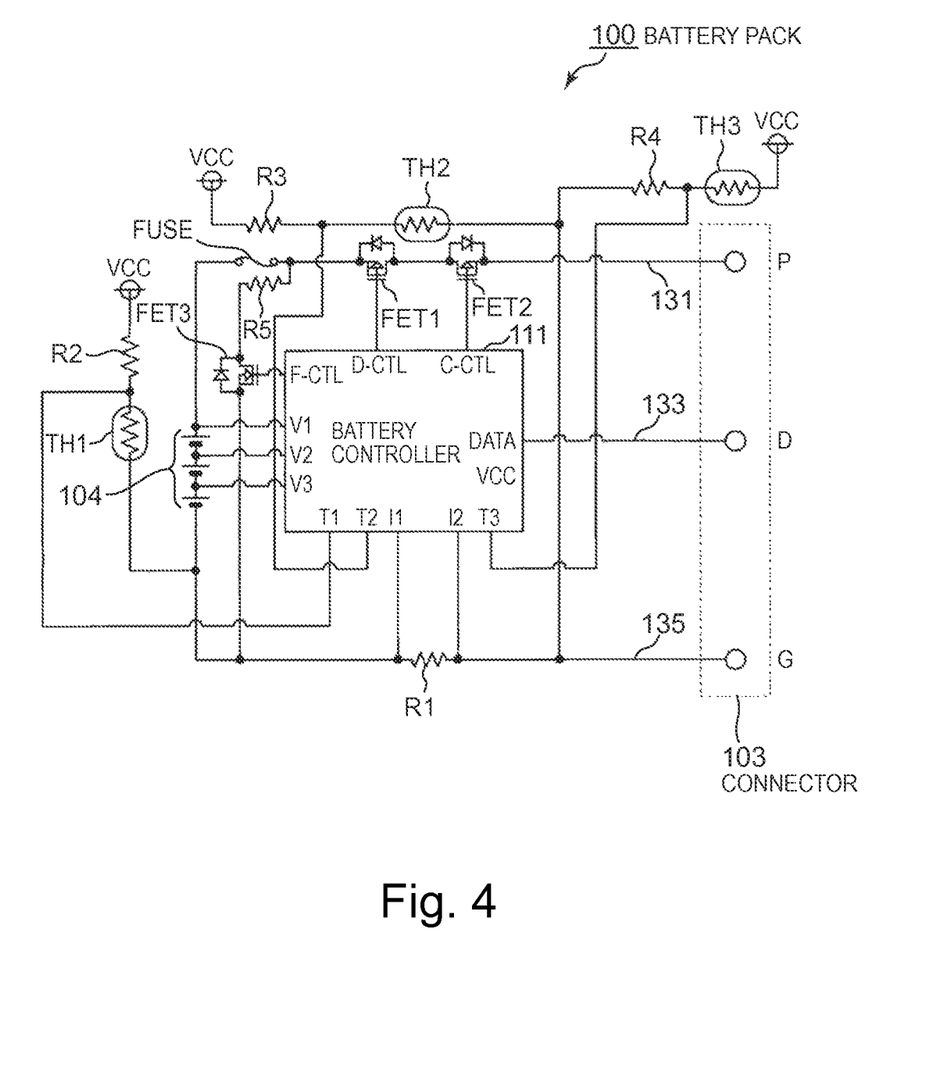
FIG. 4 is a block diagram showing an internal structure of a battery pack.

FIG. 4 is a block diagram showing an internal structure of the battery pack 100 in FIG. 3. The battery pack 100 conforms to a Smart Battery System (SBS) specification. The battery pack 100 includes the battery controller 111. A power line 131, a communication line 133, and a ground line 135 are connected to the laptop PC 10 by a P terminal, a D terminal, and a G terminal of the connector 103, respectively.

The discharge protection switch FET1 and the charge protection switch FET2 which in one embodiment are each constructed of a p-type MOS-FET, and a fuse FUSE are connected in series in the power line 131. In an embodiment, a battery set 104 composed of the six lithium ion battery cells 104a to 104f is connected in series to the discharge protection switch FET1 via the fuse FUSE. A discharge current from the battery set 104 and a charge current to the battery set 104 flow between the battery pack 100 and the laptop PC 10 through the charge/discharge circuit constituted by the power line 131 and the ground line 135. Such a charge/discharge circuit forms a charge/discharge path for the battery set 104. The charge protection switch FET2 and the discharge protection switch FET1 are ON in a normal condition, and are turned OFF by the battery controller 111 upon abnormality detection.

In addition, a series circuit of a heating wire R5 provided near the fuse FUSE and a fuse switch FET3 constructed of an n-type MOS-FET is connected in the power line 131. The fuse switch FET3 is OFF in a normal condition, and is turned ON by the battery controller 111 upon SPILL abnormality detection.

Voltage-side terminals of the battery cells of the battery set 104 are connected to analog input terminals V1, V2, V3 of the battery controller 111. The temperature element TH1 comprising one or more thermistors is attached to the surface of the battery set 104. One end of the temperature element TH1 is supplied with power Vcc from the battery controller 111 via a resistor R2, and the other end of the temperature element TH1 is connected to the ground line 135. An output of the temperature element TH1 is connected to a T1 terminal of the battery controller 111. A current sensing resistor R1 is connected in the ground line 135 between a negative terminal of the battery set 104 and the G terminal. Both ends of the current sensing resistor R1 are connected to I1 and I2 terminals of the battery controller 111.

The temperature element TH2 which may be one or more thermistors is provided near the charge protection switch FET2 and the discharge protection switch FET1. One end of the temperature element TH2 is supplied with power Vcc from the battery controller 111 via a resistor R3, and the other end of the temperature element TH2 is connected to the ground line 135. An output of the temperature element TH2 is connected to a T2 terminal of the battery controller 111. Furthermore, the temperature element TH3 comprising one or more thermistors is provided near the connector 103. One end of the temperature element TH3 is supplied with power Vcc from the battery controller 111, and the other end of the temperature element TH3 is connected to the ground line 135 via a resistor R4.

The battery controller 111 is an integrated circuit provided with a CPU, a RAM, a ROM, a flash memory, a timer, an A/D converter, a D/A converter, or an interface circuit. The battery controller 111 includes the analog input terminals V1, V2, V3 for obtaining the cell voltages of the battery cells, and the analog input terminals I1 and I2 for obtaining a potential difference between both ends of the current sensing resistor R1. The battery controller 111 also includes analog output terminals C-CTL and D-CTL for outputting signals controlling ON/OFF of the charge protection switch FET2 and the discharge protection switch FET1, and a F-CTL terminal for outputting a signal controlling ON/OFF of the fuse switch FET3 which in one embodiment are constructed of the n-type MOS-FET. The battery controller 111 can blow the fuse FUSE, by turning the fuse switch FET3 ON to cause a current to flow through the heating wire R5 near the fuse FUSE.

The battery controller 111 has the communication line 133 connected to the EC 15 in the laptop PC 10 via the DATA terminal, which allows for communication between the battery controller 111 and the EC 15. The communication line 133 also includes a clock line. The battery controller 111 sends the set current Ichg and the set voltage Vchg to be set in the charger 51, to the EC 15. The EC 15 sets the set values in the charger 51 via the reference voltage source 55, thereby starting or stopping the operation of the charger 51.

The battery controller 111 measures the charge current and the discharge current flowing through the battery set 104, from the voltage detected by the current sensing resistor R1. The battery controller 111 calculates a charge amount or a discharge amount, based on the cell voltage of the battery set 104 and the current of the current sensing resistor R1.

The battery controller 111 has an overcurrent protection function, an overvoltage protection function, and a low voltage protection function, and turns at least one of the charge protection switch FET2 and the discharge protection switch FET1 OFF when detecting an abnormality of the battery set 104 from the cell voltage of the battery set 104 and the current of the current sensing resistor R1.

The battery controller 111 also has a SPILL protection function, and turns the fuse switch FET3 ON to blow the fuse FUSE when detecting a SPILL abnormality (heat generation abnormality caused by water adhesion to the connector 103) from the detection temperature of the temperature element TH3 provided near the connector 103 and the current of the current sensing resistor R1. The applicant has discovered the following as a result of intense study. In the case where water adheres to the connector 103 of the battery pack 100, short-circuiting occurs between positive and negative electrodes. In this case, the connector 103 part has a large temperature increase, the discharge current flows through the current sensing resistor R1, and the other parts of the battery pack 100 do not have a large temperature increase. On the other hand, in the case of heat generation caused by a high temperature environment such as when left in a car, the connector 103 part and the other parts of the battery pack 100 have a large temperature increase, and the discharge current does not flow through the current sensing resistor R1. This is exploited to determine whether the cause of heat generation of the connector 103 is SPILL or a high temperature environment such as when left in a car.

Figure 5:
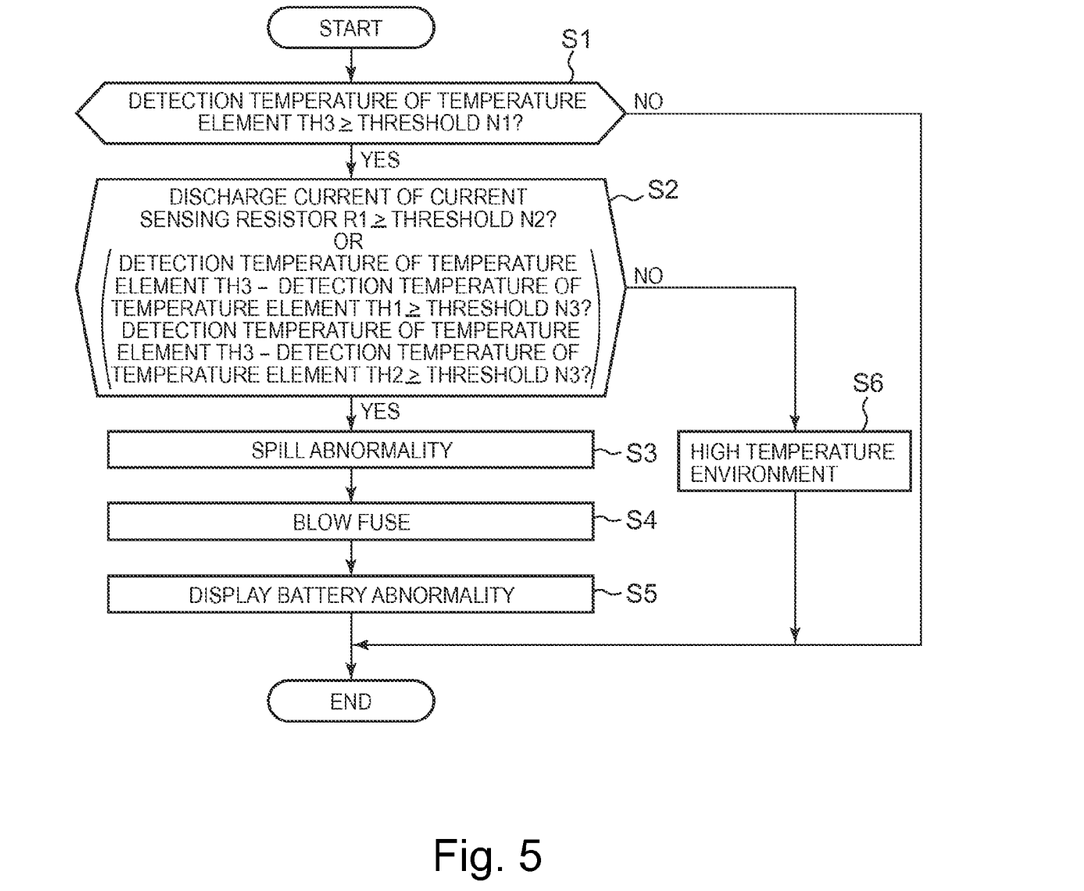
FIG. 5 is flowchart illustrating a first example of a SPILL protection function of a battery controller.

FIG. 5 is a flowchart for explaining a first example of the SPILL protection function of the battery controller 111. The battery controller 111 repeatedly executes a process shown in the flowchart of FIG. 5, at a predetermined interval. In the drawing, the battery controller 111 first determines whether or not the detection temperature of the temperature element TH3 is equal to or more than a threshold N1 (first threshold: 90° C. as a non-limiting example) (step S1). When the detection temperature of the temperature element TH3 is not equal to or more than the threshold N1 (step S1: No), the battery controller 111 ends the flow. When the detection temperature of the temperature element TH3 is equal to or more than the threshold N1 (step S1: Yes), on the other hand, the battery controller 111 determines whether or not the discharge current detected by the current sensing resistor R1 is equal to or more than a threshold N2 (second threshold) (step S2). When the discharge current detected by the current sensing resistor R1 is equal to or more than the threshold N2 (step S2: Yes), the battery controller 111 determines a SPILL abnormality (step S3). Accordingly, the battery controller 111 sets the F-CTL terminal to H to turn the fuse switch FET3 ON so that a current flows through the heating wire R5 near the fuse FUSE, thereby blowing the fuse FUSE (step S4). This stops charge or discharge of the battery set 104, preventing heat generation of the battery pack 100. After this, the battery controller 111 notifies the EC 15 of the SPILL abnormality. When a liquid crystal display panel is in operation or when a liquid crystal display device is operated, the EC 15 has the liquid crystal display device display a message indicating a battery abnormality (step S5). When the discharge current detected by the current sensing resistor R1 is not equal to or more than the threshold N2 (step S2: No), on the other hand, the battery controller 111 determines a normal high temperature environment (step S6), and ends the flow.

Here, in step S2 mentioned above, instead of determining whether or not the discharge current detected by the current sensing resistor R1 is equal to or more than the threshold N2, the battery controller 111 may determine whether or not a difference between the detection temperature of the temperature element TH3 and the detection temperature of the temperature element TH1 or a difference between the detection temperature of the temperature element TH3 and the detection temperature of the temperature element TH2 is equal to or more than a threshold N3 (third threshold: 40° C. as a non-limiting example), and determine a SPILL abnormality when the difference is equal to or more than the threshold N3.

Figure 6:
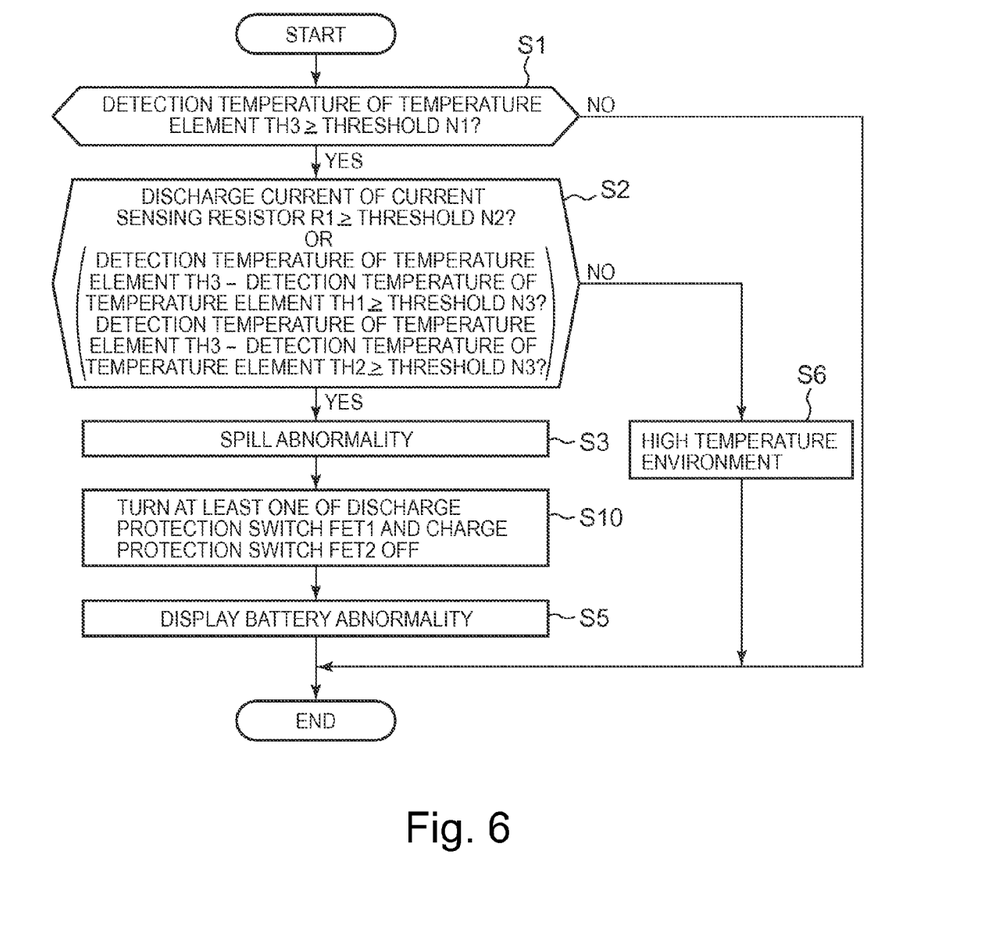
FIG. 6 is a flowchart illustrating a second example of the SPILL protection function of a battery controller.

FIG. 6 is a flowchart for explaining a second non-limiting example of the SPILL protection function of the battery controller 111. The battery controller 111 repeatedly executes a process shown in the flowchart of FIG. 6, at a predetermined interval. In FIG. 6, steps having the same functions as those in FIG. 5 are given the same step numbers, and only the difference from FIG. 5 is described below.

In FIG. 6, when determining a SPILL abnormality (step S3), the battery controller 111 turns at least one of the discharge protection switch FET1 and the charge protection switch FET2 OFF (step S10).

Subsequently, having removed the battery pack 100 from the battery bay 13 and dried the connector 103, the battery pack 100 is installed once again in the battery bay 13, and a special command is sent from the EC 15 to the battery controller 111 to clear the protection operation (the operation of turning at least one of the discharge protection switch FET1 and the charge protection switch FET2 OFF). This enables the battery pack 100 to be used again.

Note that the above-mentioned non-limiting first and second examples may be used in combination. For example, when detecting a SPILL abnormality, the battery controller 111 may blow the fuse FUSE and also turn at least one of the discharge protection switch FET1 and the charge protection switch FET2 OFF. Moreover, in the case where the detection temperature of the temperature element TH3 is equal to or more than the threshold N1, the battery controller 111 may determine a SPILL abnormality when the discharge current detected by the current sensing resistor R1 is equal to or more than the threshold N2 and also the difference between the detection temperature of the temperature element TH3 and the detection temperature of the temperature element TH1 or the difference between the detection temperature of the temperature element TH3 and the detection temperature of the temperature element TH2 is equal to or more than the threshold N3.

As described above, according to one embodiment, when the detected temperature of the connector 103 is equal to or more than the first threshold, and also the discharge current is equal to or more than the second threshold and/or the difference between the detected temperature of the connector 103 and the detected temperature of the other part (the discharge protection switch FET1, the charge protection switch FET2, the battery set 104) is equal to or more than the third threshold, an abnormality is determined and an operation of interrupting the charge/discharge path for the battery set 104 formed by the charge/discharge circuit is executed. In this way, an abnormal condition caused by heat generation associated with water adhesion to the connector part can be avoided. Moreover, it is possible through this simple method to determine whether the cause of heat generation of the connector 103 is SPILL or a high temperature environment such as when left in a car.

In addition, according to one embodiment, the operation of interrupting the charge/discharge path is at least one of an operation of interrupting the charge/discharge path by the switching element (the discharge protection switch FET1, the charge protection switch FET2) that forms a part of the charge/discharge path and an operation of blowing the fuse that forms a part of the charge/discharge path. Thus, the charge/discharge path can be interrupted by a simple and low-cost structure.

Though the above embodiment describes a battery pack installed in a laptop PC, the embodiments are not limited to this, and is applicable to a battery pack used in electronic devices such as computers, mobile phones, PDA's, electric tools, and transportation equipment.

As described above, the battery pack and the function stopping method of the battery pack according to embodiments are useful for a battery pack used in electronic devices such as computers, mobile phones, PDA's, electric tools, and transportation equipment.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those particular descriptions, and that various other changes and modifications may be affected therein by one skilled in the art without departing from the scope or spirit of the disclosure.

What is claimed is:

1. An apparatus comprising:
   one or more elements of the apparatus comprising at least one processor, consumes power;
   a housing that houses the one or more dements comprising at least one processor;
   a battery pack for supplying power, the battery pack having a connector that "connects the battery pack to the one or more elements comprising at least one processor, the battery pack further comprising:
      a charge and discharge circuit that forms a charge and discharge path;
      a first temperature element that senses heat generated by the connector;
      a second temperature element that senses a temperature of another part of the battery pack; and
      a controller that disables the battery pack responsive to determining heat generation at the connector;

wherein the determining comprises;
detecting heat at the first temperature element;
detecting a heat at the second temperature element; and
wherein a difference in the heat detected at the first temperature element and the heat detected at the second temperature element exceeds a predetermined threshold.

2. The apparatus according to claim 1, further comprising:
a discharge measurement element for measuring a discharge current;
wherein the controller disables the battery pack responsive to determining a temperature is above the predetermined threshold at the first temperature element and determining a discharge is above another predetermined threshold at the discharge measurement element.

3. The apparatus according to claim 1, wherein the controller disables the battery pack responsive to determining a temperature is above the predetermined threshold at the first temperature element and determining a temperature difference is above another predetermined threshold, the temperature difference being defined as a difference value as determined by subtracting a temperature value measured at the first temperature element from a temperature value measured by the second temperature element.

4. The apparatus according to claim 2, wherein the controller disables the battery pack responsive to one or more of:
determining a temperature is above the predetermined threshold at the first temperature element and determining a discharge is above another predetermined threshold at the discharge measurement element; and
determining a temperature is above the predetermined threshold at the first temperature element and determining a temperature difference is above another predetermined threshold, the temperature difference being defined as a difference value as determined by subtracting a temperature value measured at the first temperature element from a temperature value measured by the second temperature element.

5. The apparatus according to claim 1, wherein to disable the battery pack further comprises temporarily disabling the battery pack via a switching element.

6. The apparatus according to claim 1, wherein to disable the battery pack further comprises blowing a fuse.

7. A method comprising:
determining a heat generation at a connector of a battery pack using a first temperature element that senses heat generated by the connector of the battery pack and a second temperature element that senses a temperature of another part of the battery pack; and
disabling the battery pack responsive to determining the heat generation at the connector of a battery pack;
wherein the determining comprises;
detecting heat at the first temperature element;
detecting a heat at the second temperature element; and
wherein a difference in the heat detected at the first temperature element and the heat detected at the second temperature element exceeds a predetermined threshold.

8. The method according to claim 7, wherein the determining heat generation at a connector of a battery pack further comprises:
determining a temperature at the first temperature element;
determining a discharge at a discharge measurement element; and
responsive to determining that the temperature is above the first predetermined threshold and the discharge is above another predetermined threshold, determining the heat generation.

9. The method according to claim 7, wherein the determining heat generation at a connector of a battery pack further comprises:
determining a temperature at the first temperature element;
determining a second temperature at the second temperature element; and
responsive to determining the first temperature is above the predetermined threshold and a temperature difference is above another predetermined threshold, the temperature difference being defined as a difference value as determined by subtracting the first temperature value from the second temperature value, determining the heat generation.

10. The method according to claim 7, wherein determining heat generation at a connector of a battery pack further comprises one or more of:
determining a temperature is above the predetermined threshold at a first temperature element and determining a discharge is above another predetermined threshold at a discharge measurement element; and
determining a temperature is above the predetermined threshold at the first temperature element and determining a temperature difference is above another predetermined threshold, the temperature difference being defined as a difference value as determined by subtracting a temperature value measured at the first temperature element from a temperature value measured by a second temperature element.

11. The method according to claim 7, wherein to disabling the battery pack further comprises temporarily disabling the battery pack via a switching element.

12. The method according to claim 7, wherein disabling the battery pack further comprises blowing a fuse.

13. The method according to claim 7, further comprising placing the battery pack within an apparatus selected from the group consisting of a computer, a mobile phone, a PDA, an electric tool, and a piece of transportation equipment.

14. A battery pack comprising:
a connector that connects the battery pack to the one or more elements of the apparatus comprising at least one processor, requiring power;
a charge and discharge circuit that forms a charge and discharge path;
a first temperature element that senses heat generated by the connector;
a second temperature element that senses a temperature of another part of the battery pack; and
a controller that disables the battery pack responsive to determining characteristic heat generation at the connector;
wherein the determining comprises;
detecting a heat at the first temperature element;
detecting a heat at the second temperature element; and
wherein a difference in the heat detected at the first temperature element and the heat detected at the second temperature element exceeds a predetermined threshold.

15. The battery pack according to claim 14, further comprising:
a discharge measurement element for measuring a discharge current;
wherein the controller disables the battery pack responsive to determining a temperature is above the predetermined threshold at the first temperature element and determining a discharge is above another predetermined threshold at the discharge measurement element.

16. The battery pack according to claim 14, wherein the controller disables the battery pack responsive to determining a temperature is above the predetermined threshold at the first temperature element and determining a temperature difference is above another predetermined threshold, the temperature difference being defined as a difference value as determined by subtracting a temperature value measured at the first temperature element from a temperature value measured by the second temperature element.

17. The battery pack according to claim 14, wherein the controller disables the battery pack responsive to one or more of:
   determining a temperature is above the predetermined threshold at the first temperature element and determining a discharge is above another predetermined threshold at the discharge measurement element; and
   determining a temperature is above the predetermined threshold at the first temperature element and determining a temperature difference is above another predetermined threshold, the temperature difference being defined as a difference value as determined by subtracting a temperature value measured at the first temperature element from a temperature value measured by the second temperature element.

18. The battery pack according to claim 14, wherein disabling the battery pack further comprises temporarily disabling the battery pack via a switching element.

19. The battery pack according to claim 14, wherein disabling the battery pack further comprises blowing a fuse.

\* \* \* \* \*